United States Patent [19]

Koyama et al.

[11] Patent Number: 5,656,350

[45] Date of Patent: Aug. 12, 1997

[54] COIL IMPREGNANT OF EPOXY RESIN FROM POLYHYDRIC PHENOL MIXTURE

[75] Inventors: Toru Koyama; Chikashi Kanno; Hirokazu Takasaki, all of Hitachi; Koo Honjoo, Ibaraki-ken; Shinichi Toyoda, Katsuta; Hiroshi Suzuki, Hitachi; Ikushi Kano, Ibaraki-ken, all of Japan

[73] Assignee: Hitachi, Ltd., Tokyo, Japan

[21] Appl. No.: 381,284

[22] Filed: Jan. 31, 1995

Related U.S. Application Data

[63] Continuation of Ser. No. 165,520, Dec. 13, 1993, which is a continuation of Ser. No. 94,929, Jul. 22, 1993, abandoned, which is a continuation of Ser. No. 481,614, Feb. 20, 1990, abandoned.

[30] Foreign Application Priority Data

Feb. 21, 1989 [JP] Japan .................... 1-39355

[51] Int. Cl.$^6$ .................. B32B 3/02; B32B 27/38
[52] U.S. Cl. ............... 428/66.6; 428/413; 428/703; 525/533; 528/104
[58] Field of Search ............... 428/65, 415, 703, 428/66.6; 525/524, 533; 528/87, 98, 104, 112

[56] References Cited

U.S. PATENT DOCUMENTS 4,113,791 9/1978 Smith et al. .............. 525/533
4,127,695 11/1978 Hirakawa et al. .......... 428/371
4,390,664 6/1983 Kanayama ................ 528/104
4,558,116 12/1985 Wernli et al. ............. 528/87

FOREIGN PATENT DOCUMENTS 0365984 5/1990 European Pat. Off. ........ 528/98
1-230619 9/1989 Japan .................... 528/104
1141405 1/1969 United Kingdom .......... 528/87
2165251 4/1986 United Kingdom .......... 528/104

OTHER PUBLICATIONS

*The Condensed Chemical Dictionary*, 8th Edition, Van Nostrand Reinhold Co., New York, N.Y., 1971, p. 601.

Primary Examiner—Robert E. Sellers
Attorney, Agent, or Firm—Antonelli, Terry, Stout & Kraus, LLP

[57] ABSTRACT

A thermosetting resin composition comprising:

[A] a polyfunctional epoxy resin produced from a reaction between a mixture of at least two polyhydric phenols selected from (a) bis(4-hydroxyphenyl)methane, (b) bis(4-hydroxyphenyl)ethane, (c) bis(4-hydroxyphenyl)-propane, (d) tris(4-hydroxyphenyl)alkane and (e) tetra(4-hydroxyphenyl)alkane, and epichlorohydrin, and

[B] an acid anhydride curing agent; and a coil and a panel formed of said composition.

22 Claims, 3 Drawing Sheets

FIG. 5-a
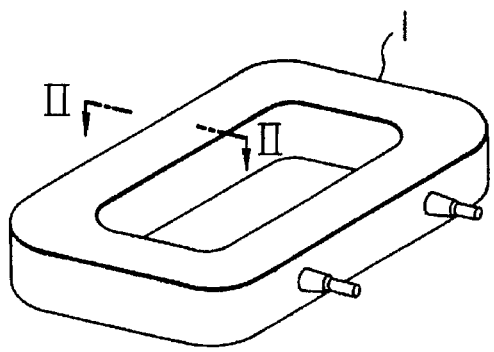
FIG. 5-b
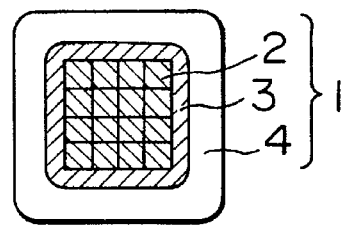
FIG. 6
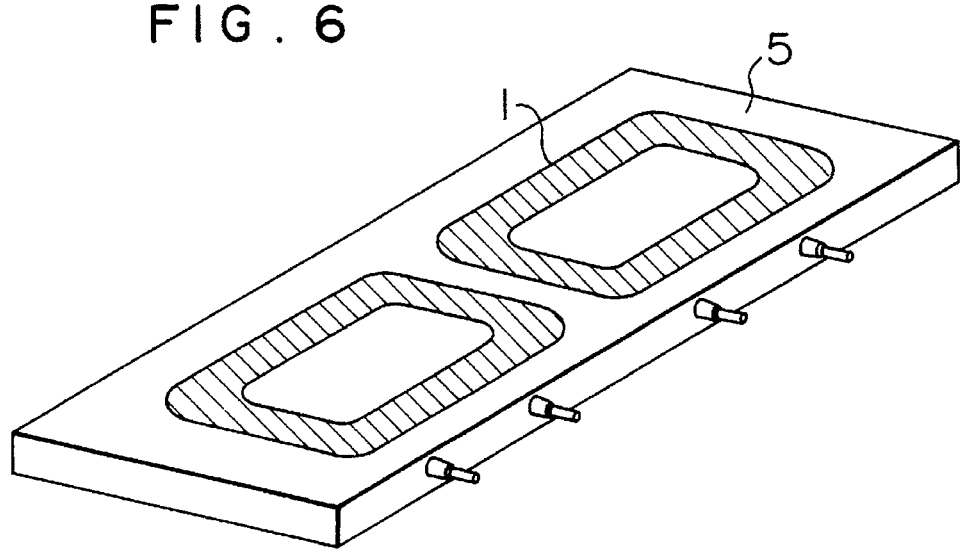

COIL IMPREGNANT OF EPOXY RESIN FROM POLYHYDRIC PHENOL MIXTURE

This application is a continuation application of Ser. No. 165,520, filed Dec. 13, 1993, (now abandoned) which is a continuation application of Ser. No. 094,929, filed Jul. 22, 1993, (now abandoned) which is a continuation application of Ser. No. 481,614, filed Feb. 20, 1990 (now abandoned).

BACKGROUND OF THE INVENTION

1. Field of the Invention

This invention relates to a thermosetting resin composition, and a coil and a panel which use said thermosetting resin composition. In particular, it relates to a thermosetting resin having a low viscosity before cured or good processability and having high heat resistance after cured, and a coil and a panel which use said thermosetting resin composition.

2. Description of the Related Art

In recent years, insulation treatment technique has been remarkably developed, and above all, a method for sealing by impregnation or cast-molding with a solvent-free epoxy-based thermosetting resin composition has been rapidly developed in fields of rotors and stationary devices used under severe conditions, in view of the fact that said composition has (1) electrically high reliability, (2) good heat dissipation property, (3) excellent heat resistance, etc.

In impregnation or cast molding of coils for such rotors or stationary devices, the requirements of the solvent-free epoxy-based thermosetting resin composition are that (1) the composition has such a low viscosity that the coil impregnation or cast molding can be easily carried out, (2) the composition generates no volatiles at a heat-curing step so as to form no voids, (3) the composition has good electrical and mechanical properties, and (4) the composition has high heat resistance or good short-term and long-term resistance to thermal deterioration.

In general, it is mainly customary practice to introduce a heteroring into a molecular structure, like maleimide, in order to increase the heat resistance of a thermosetting resin composition. However, if the heteroring is introduced into the molecular structure, the resultant resin composition has a high viscosity, and no resin composition can simultaneously satisfy a low viscosity and a high heat resistance. Thus, there has been an attempt to combine maleimide with an epoxy resin in order to achieve a low viscosity. There are, however, problems that the heat resistance of the resultant resin composition is low, that precipitation occurs during storage, etc.

Polyfunctional epoxy resins, such as trifunctional or higher-functionality epoxy resins described in Japanese Patent Publications Nos. 13571/82, 14763/82, 1648/87, 44767/87, etc., attract attention due to their comparatively low costs and excellent heat resistance.

OBJECT AND SUMMARY OF THE INVENTION

This invention has been made in view of the above situation, and the object thereof is to provide a coil and a panel which use a thermosetting resin composition having a low viscosity before cured or good processability and having high heat resistance after cured.

The above-referenced trifunctional or higher-functionality epoxy resins are available at comparatively low costs and excellent in heat resistance. Since, however, they are in a solid state or have a high viscosity, it has been desired to decrease their viscosity without degrading their heat resistance. One method therefor may be to mix a polyfunctional epoxy resin with a liquid difunctional epoxy resin having a low viscosity. For this reason, a mixture system of these two resins was studied, and it was found that since the mixture system was a competition reaction system of a trifunctional epoxy resin, difunctional epoxy resin and a curing agent, it was difficult to mix them uniformly or unify the property of the resultant cured product. Further, the use of a large amount of a liquid difunctional epoxy resin caused a problem of inferior heat resistance.

It is considered that a low viscosity can be achieved as follows. When at least two polyhydric phenols and epichlorohydrin are allowed to react, and if it is possible to obtain a mixture of a reaction product between each of the polyhydric phenols and the epichlorohydrin with a direct reaction product among the polyhydric phenols and the epichlorohydrin, the direct reaction product among the polyhydric phenols and the epichlorohydrin can work as an agent for a reaction between the reaction product between each of the polyhydric phenols and the epichlorohydrin, i.e. a mixture of a trifunctional epoxy resin with a difunctional epoxy resin and a curing agent, or it can allow these two epoxy resins to react uniformly, and deform the symmetry of the polyfunctional epoxy resins. Hence, incorporation of a small amount of a difunctional epoxy resin can achieve a low viscosity.

Japanese Patent Publications Nos. 29487/82, 1648/87 and 19450/87 suggest a reaction of at least two polyhydric phenols with epichlorohydrin. However, they describe nothing concerning the above consideration.

Thus, in order to deform the symmetry of polyfunctional epoxy resins and mix these two resins uniformly, reactions of at least two polyhydric phenols with epichiorohydrin have been studied, and this invention has been made.

It is an object of this invention to provide a thermosetting resin composition which can meet achievement of low viscosity and achievement of high heat resistance, which are usually incompatible, and a coil and panel which use the composition.

The above object can be achieved by forming a thermosetting resin composition from a polyfunctional epoxy resin produced from a reaction between a mixture of at least two specific polyhydric phenols and epichlorohydrin.

That is, according to this invention, there is provided a thermoserring resin composition having a low viscosity before cured and high heat resistance after cured, which comprises:

[A] a polyfunctional epoxy resin produced from a reaction between a mixture of at least two polyhydric phenols selected from (a) bis(4-hydroxyphenyl)methane, (b) bis(4-hydroxyphenyl)ethane, (c) bis(4-hydroxyphenyl)-propane, (d) tris(4-hydroxyphenyl)alkane and (e) tetra(4-hydroxyphenyl)alkane, and epichlorohydrin, and

[B] an acid anhydride curing agent

There is also provided a thermosetting resin composition which comprises the polyfunctional epoxy resin specified in the above [A] and a polyfunctional epoxy resin other than that specified in the above [A] in combination. Further, there are provided a coil formed by impregnating or cast-molding a coil conductor, around which an insulation base material may be coiled, with the above thermosetting resin composition and curing it, and a panel formed by embedding the coil in a concrete.

The thermoserring resin composition comprising a polyfunctional epoxy resin obtained by a reaction between a mixture of at least two polyhydric phenols and epichlorohydrin, provided by this invention, exhibits a low viscosity before cured or good processability and high heat resistance after cured as compared with a thermosetting resin composition comprising a blend of polyfunctional epoxy resins each of which is obtained by a reaction between one polyhydric phenol and epichlorohydrin. Thus, the thermosetting resin composition of this invention meets achievement of low viscosity and achievement of high heat resistance which are usually incompatible. Further, coils using the thermosetting resin composition of this invention are free from voids and excellent in electrical and mechanical properties.

BRIEF DESCRIPTION OF THE DRAWINGS

FIG. 5-a is a perspective view of a ground coil for a linear motor car.

FIG. 5-b is an enlarged cross sectional view taken from a line II—II in FIG. 5-a.

FIG. 6 is a perspective view showing a ground coil panel for a linear motor car.

Figure 1:
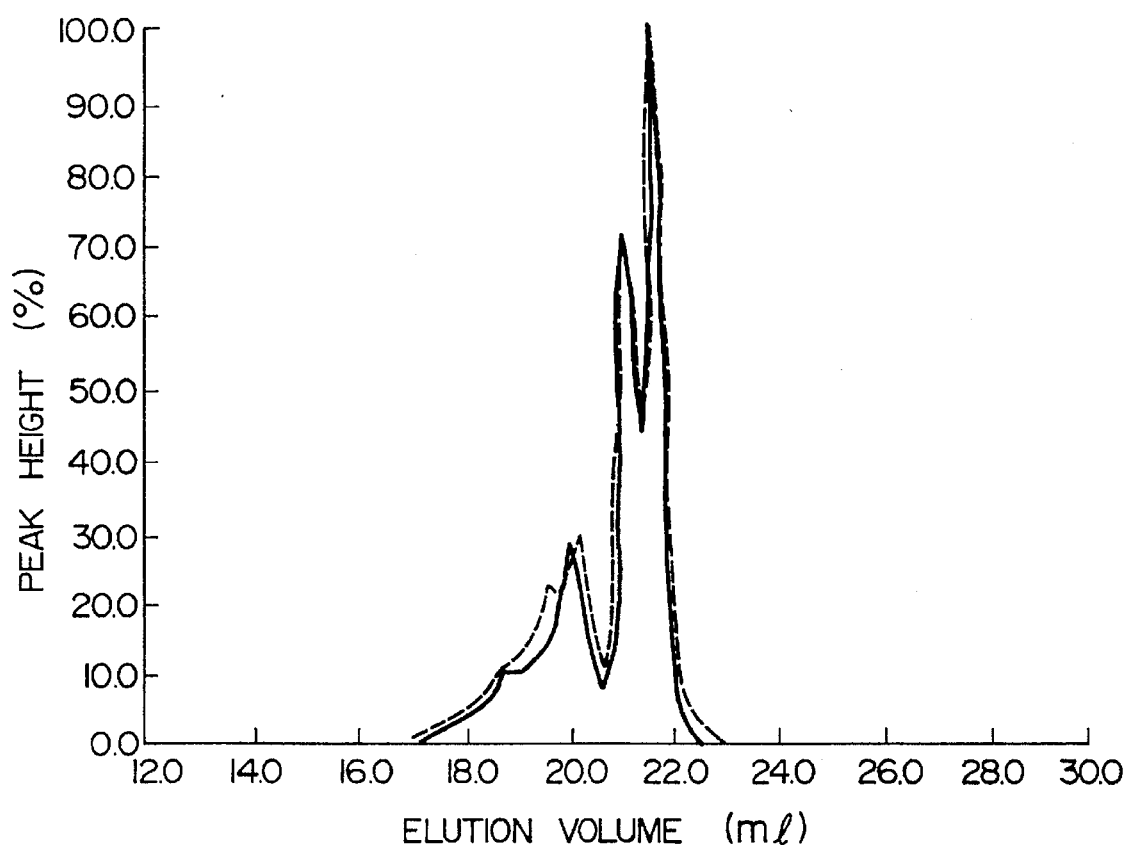
FIG. 1 is a liquid chromatogram of an epoxy resin.

In FIGS., 1 indicates a coil, 2 indicates a conductor, 3 indicates a prepreg mica tape having a glass lining, 4 indicates a thermosetting resin composition, and 5 indicates a concrete.

DETAILED DESCRIPTION OF THE PREFERRED EMBODIMENTS

Examples of the tris(4-hydroxyphenyl)alkane used in this invention include tris(4-hydroxyphenyl)-methane, tris(4-hydroxyphenyl)ethane, tris(4-hydroxyphenyl)propane, tris(4-hydroxyphenyl)butane, tris(4-hydroxyphenyl)hexane, tris(4-hydroxyphenyl)heptane, tris(4-hydroxyphenyl)octane, tris(4-hydroxyphenyl)nonane, etc. Tris(4-Hydroxyphenyl)alkane derivatives such as tris(4-hydroxydimethylphenyl)methane, etc., may be also used.

Examples of the tetra(4-hydroxyphenyl)alkane include tetra(4-hydroxyphenyl)methane, tetra(4-hydroxyphenyl)ethane, tetra(4-hydroxyphenyl)propane, tetra(4-hydroxyphenyl)butane, tetra(4-hydroxyphenyl)hexane, tetra(4-hydroxyphenyl)heptane, tetra(4-hydroxyphenyl)octane, tetra(4-hydroxyphenyl)nonane, etc. Tetra(4-Hydroxyphenyl)alkane derivatives such as tetra(4-hydroxydimethylphenyl)methane, etc., may be also used.

In view of heat resistance, it is preferable that the mixture of at least two polyhydric phenols used in this invention contains at least 20 to 70 parts of tris(4-hydroxyphenyl)alkane or tetra(4-hydroxyphenyl)-alkane and 80 to 30 parts of bis(4-hydroxyphenyl)alkane.

Further, in view of achievement of a low viscosity, it is preferable that the mixture of at least two polyhydric phenols contains at least two bis(4-hydroxyphenyl)alkanes.

Acid anhydrides usually used as a curing agent are usable in this invention without any special limitation. Examples of such anhydrides include methylhexahydrophthalic anhydride, hexahydrophthalic anhydride, methyltetrahydrophthalic anhydride, tetrahydrophthalic anhydride, nadic anhydride, methylnadic anhydride, dodecylsuccinic anhydride, succinic anhydride, maleic anhydride, benzophenonetetracarboxylic anhydride. These are usable alone or in combination. The amount of the epoxy resin based on 1 equivalent weight of the anhydride curing agent is preferably an epoxy equivalent of 0.8 to 1.5 in the presence of a curing catalyst and an equivalent of 1.5 to 2.5 in the absence of a curing catalyst.

When the thermosetting resin composition of this invention is cured, a curing catalyst may be added to the thermosetting resin composition or the insulating base material as required. The curing catalyst is not critical if it works to accelerate a reaction between the polyfunctional epoxy resin and the curing agent.

Examples of the curing catalyst include tertiary amines such as trimethylamine, triethylamine, tetramethylbutanediamine, triethylenediamine, etc., amines such as dimethylaminoethanol, dimethylaminopentanol, tris (dimethylaminomethyl)phenol, N-methylmorpholine, quaternary ammonium salts such as cetyltrimethylammonium bromide, cetyltrimethylammonium chloride, cetyltrimethylammonium iodide, dodecyltrimethylammonium bromide, dodecyltrimethyl- ammonium chloride, dodecyltrimethylammonium iodide, benzyldimethyltetradecylammonium chloride, benzyldimethyltetradecylammonium bromide, allyldodecyltrimethylammonium bromide, benzyldimethylstearylammonium bromide, stearyltrimethylammonium chloride, benzyldimethyltetradecylammonium acetylate, etc., imidazoles such as 2-methylimidazole, 2-ethylimidazole, 2-undecylimidazole, 2-heptadecylimidazole, 2-methyl-4ethylimidazole, 1-butylimidazole, 1-propyl-2-methyl-imidazole, 1-benzyl-2-methylimidazole, 1-cyanoethyl-2phenylimidazole, 1-cyanoethyl-2-methylimidazole, 1-cyanoethyl-2-undecylimidazole, 1-azine-2-methylimidazole, 1-azine-2-undecylimidazole, etc., metal salt of amine with zinc octanoate, cobalt or the like, 1,8-diaza- bicyclo(5.4.0)-undecene-7,N-methylpiperazine, tetramethylbutylguanidine, amine tetraphenyl borates such as triethylammoniumtetra-phenyl borate, 2-ethyl-4-methyltetraphenyl borate, 1,8-diaza-bicyclo(5.4.0)-undecene-7-tetraphenyl borate, etc., triphenylphosphine, triphenylphosphoniumtetraphenyl borate, aluminum trialkylacetoacetate, aluminum trisacetylacetoacetate, aluminum alcoholate, aluminum acylate, sodium alcoholate, etc.

In general, such a curing catalyst is usually added in an amount of 0.01 to 5% by weight based on the thermosetting resin composition.

Examples of the insulating base material include glass fiber, aramide, aramide-combined paper, polyamideimide, polyester, a mica tape having a lining of polyimide, glass fiber, aramide, aramide-combined paper, polyamideimide, polyester or polyimide, and the like. These base materials may be used even in a sheet or tape form.

Further, a diluent may be optionally incorporated. Examples of the diluent include difunctional epoxy resins such as diglycidyl ether of bisphenol A, diglycidyl ether of bisphenol F, 3,4-epoxycyclohexyl- methyl-(3,4-epoxy)cyclohexane carboxylate, etc., monoepoxy resins such as cyclohexenevinyl monooxide, octylene oxide, butylglycidyl ether, styrene oxide, phenylglycidyl ether, glycidyl methacryalte, allylglycidyl ether, etc., and the like. However, the diluent decreases heat resistance although it has an effect on a decrease in viscosity. Thus, the amount thereof should be as small as possible.

A filler may be also incorporated. Examples of the filler include silica powder, silica glass powder, alumina, hydrate alumina, magnesium hydrate, calcium carbonate, zirconium silicate, talc, clay, mica, glass fiber powder, etc.

When the mixture of at least two polyhydric phenols selected from bis(4-hydroxyphenyl)methane, bis(4-hydroxyphenyl)ethane, bis(4-hydroxyphenyl)propane, tris(4-hydroxyphenyl)alkane and tetra(4-hydroxyphenyl)alkane, and epichlorohydrin are allowed to react with epichlorohydrin in this invention, a polyfunctional epoxy resin having an asymmetric structure is formed as well, differing from a reaction between one polyhydric phenyl and epichlorohydrin. Therefore, the reaction proceeds more uniformly than the reaction between one polyhydric phenol and epichlorohydrin, and the resultant polyfunctional epoxy resin has a lower viscosity than any usual polyfunctional epoxy resin obtained by the reaction between one polyhydric phenol and epichlorohydrin and a blend thereof.

The polyfunctional epoxy resin obtained in this invention has better heat resistance than any usual polyfunctional epoxy resin obtained by the reaction between one polyhydric phenol and epichlorohydrin, since the polyfunctional epoxy resin of this invention is a product in which at least two polyhydric phenols are combined, differing from a usual polyfunctional epoxy resin produced by a reaction between one polyhydric phenol and epichlorohydrin.

The following Examples will illustrate this invention more specifically, which, however, shall not limit the invention. The following are abbreviations for epoxy resins, curing agents and curing catalysts used in examples.

YL-931: 1,1,2,2-tetra(p-glycidylphenyl)ethane, epoxy equivalent 192

YL-932: 1,1,3-tris(p-glycidylphenyl)propane, epoxy equivalent 161

YL-933: 1,1,3-tris(p-grydicylphenyl)butane, epoxy equivalent 196

DER-7342: tris(p-glycidylphenyl)methane, epoxy equivalent 162

BPAN: novolak-type epoxy of bisphenol A, epoxy equivalent 198

DER-332: glycidyl ether of bisphenol A, epoxy equivalent 175

CEL-2021: 3,4-epoxycyclohexylmethyl-(3,4-epoxy)cyclohexane carboxyalte, epoxy equivalent 138

E-807: glycidyl ether of bisphenol F, epoxy equivalent 170

MHAC-P: Methylnadic anhydride, anhydride equivalent 178

HN-5500: methylhexahydrophthalic anhydride, anhydride equivalent 168

HN-2200: methyltetrahydrophthalic anhydride, anhydride equivalent 166

BTPP-K: triphenylbutylphosphinetetraphenylborate

PX-48T:

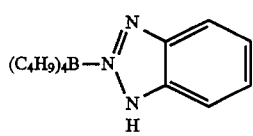

2E4MZ: 2-ethyl-4-methylimidazole

2E4MZ-K: 2-ethyl-4-methylimidazoletetraphenylborate

TPP-triphenylphosphine

TPP-K: triphenylphosphinetetraphenylborate

IOZ: salt of 2-ethyl-4-methylimidazole and zinc octanoate

C11Z-AZINE: 1-azine-2-undecylimidazole

TEA-K: triethylaminetetraphenylborate

2E4MZ-CN: 1-cyanoethyl-2-ethyl-4-methylimidazole

EXAMPLES 1–18

A reactor having a thermometer, stirrer, dropping funnel and reaction water recovery device was charged with polyhydric phenols and epichlorohydrin in amounts as shown in Table 1, and while the mixture was stirred under heat, 175 g of a 48 wt % sodium hydroxide aqueous solution was added dropwise over 2 hours. During the reaction, it was adjusted that water and the epichlorohydrin were distilled from a reaction mixture and that only the epichlorohydrin was recycled to the reactor. The concentration of water in the reaction mixture was also adjusted to be not more than 5 wt %.

After the sodium hydroxide aqueous solution was added, the reaction mixture was further heated for 15 minutes to remove water completely, and then unreacted epichlorohydrin was distilled off. In order to ease separation of sodium chloride from a resultant crude product, about 55 g of toluene was added to the crude product, and the resultant mixture solution was filtered to remove sodium chloride. Thereafter, the toluene was completely distilled off by heating the mixture solution up to 170° C. and 2 mmHg to give a yellowish epoxy resin. Table 2, shows physical properties of epoxy resins obtained as above in these Examples 1–18.

Further, FIG. 1 shows, by a dotted line, a liquid chromotogram of the epoxy resin obtained in Example 1. For comparison, FIG. 1 also shows, by a solid line, a liquid chromatogram of a mixture of an epoxy resin produced by a reaction between bis(4-hydroxyphenyl)propane and epichlorohydrin with an epoxy resin produced by a reaction between tris(4-hydroxyphenyl)methane and epichlorohydrin. the epoxy resin of Example 1, obtained by a reaction between a mixture of bis(4-hydroxyphenyl)-propane with tris(4-hydroxyphenyl)methane and epichlorohydrin, showed peaks in different places from those in which the mixture of an epoxy resin produced by a reaction between bis(4-hydroxyphenyl)propane and epichlorohydrin with an epoxy resin produced by a reaction between tris(4-hydroxyphenyl)methane and epichlorohydrin did. Thus, the epoxy resin of Example 1 was that which had an asymmetric structure.

TABLE 1

| | Charged components | | |
|---|---|---|---|
| Example | Polyhydric phenol (g) | | Epichlorohydrin (g) |
| 1 | tris(4-hydroxyphenyl)methane | 105 | 925 |
|   | bis(4-hydroxyphenyl)propane | 105 | |
| 2 | tris(4-hydroxyphenyl)methane | 99 | 925 |
|   | bis(4-hydroxyphenyl)methane | 99 | |
| 6 | tris(4-hydroxyphenyl)butane | 112 | 925 |
|   | bis(4-hydroxyphenyl)propane | 112 | |
| 7 | tris(4-hydroxyphenyl)octane | 122 | 925 |
|   | bis(4-hydroxyphenyl)propane | 122 | |
| 8 | tetra(4-hydroxyphenyl)ethane | 106 | 925 |
|   | bis(4-hydroxyphenyl)propane | 106 | |
| 9 | tetra(4-hydroxyphenyl)propane | 108 | 925 |
|   | bis(4-hydroxyphenyl)propane | 108 | |
| 10 | tetra(4-hydroxyphenyl)octane | 117 | 925 |

TABLE 1-continued

| Example | Charged components Polyhydric phenol (g) | | Epichlorohydrin (g) |
|---|---|---|---|
| | bis(4-hydroxyphenyl)propane | 110 | |
| 11 | tris(4-hydroxyphenyl)methane | 20 | 925 |
| | bis(4-hydroxyphenyl)propane | 205 | |
| 12 | tris(4-hydroxyphenyl)methane | 30 | 925 |
| | bis(4-hydroxyphenyl)propane | 193 | |
| 13 | tris(4-hydroxyphenyl)methane | 50 | 925 |
| | bis(4-hydroxyphenyl)propane | 170 | |
| 14 | tris(4-hydroxyphenyl)methane | 150 | 925 |
| | bis(4-hydroxyphenyl)propane | 111 | |
| 15 | bis(4-hydroxyphenyl)methane | 100 | 925 |
| | bis(4-hydroxyphenyl)propane | 114 | |
| 16 | bis(4-hydroxyphenyl)ethane | 107 | 925 |
| | bis(4-hydroxyphenyl)propane | 114 | |
| 17 | bis(4-hydroxyphenyl)methane | 100 | 925 |
| | bis(4-hydroxyphenyl)ethane | 107 | |
| 18 | tris(4-hydroxyphenyl)methane | 108 | 925 |
| | bis(4-hydroxyphenyl)butane | 108 | |

TABLE 2

| Example | Epoxy equivalent (g/equiv) | Total chlorine amount (%) |
|---|---|---|
| 1 | 171 | 0.20 |
| 2 | 160 | 0.23 |
| 3 | 165 | 0.21 |
| 4 | 173 | 0.19 |
| 5 | 176 | 0.20 |
| 6 | 179 | 0.21 |
| 7 | 188 | 0.18 |
| 8 | 172 | 0.19 |
| 9 | 173 | 0.20 |
| 10 | 189 | 0.19 |
| 11 | 176 | 0.20 |
| 12 | 174 | 0.19 |
| 13 | 173 | 0.20 |
| 14 | 169 | 0.18 |
| 15 | 173 | 0.17 |
| 16 | 174 | 0.18 |
| 17 | 175 | 0.17 |
| 18 | 170 | 0.23 |

EXAMPLES 19–30 AND COMPARATIVE EXAMPLES 1–5

An epoxy resin and an anhydride curing agent MHAC-P were mixed in a mixing ratio as shown in Table 3, and fully stirred. Added to this mixture was 0.5% by weight of a curing catalyst 2E4MZ, and they were fully mixed. The resultant mixture had a viscosity at 40° C. as shown in Table 3. The mixture was heated at 100° C. for 10 hours, at 150° C. for 10 hours and at 230° C. for 10 hours to give a brown-colored clear cured product having a thickness of 2 mm. The cured product was cut into samples having a size of 2×50×50 mm, and its heat resistance temperature index was determined, which is shown in Table 3. In addition, the heat resistance temperature index was determined according to IEC-Pub. 216. That is, the samples having a size of 2×50×50 mm were individually placed in an air-circulating thermostatic oven adjusted to 270° C., 250° C. or 230° C., the samples were taken out of the ovens every predetermined period of time, and their weights were measured to determine a ratio of weight decrease under heat. The time during which the weight decrease in each sample became 10% by weight was determined and referred to as a life. Then, plotting of the life and the inverse number of absolute temperature showed a linear relationship concerning each sample. The linear relationship was extrapolated, and a temperature at which the life was to reach 20,000 hours was determined. The determined temperature is referred to as a heat resistance temperature index. In addition, the heat resistance of each resin was evaluated on the basis of the heat resistance temperature index.

The thermosetting resin composition comprising a polyfunctional epoxy resin obtained by a reaction between a mixture of at least two polyhydric phenols and epichlorohydrin, provided by this invention, exhibits a lower viscosity before cured and higher heat resistance after cured than a thermosetting resin composition comprising a blend of polyfunctional epoxy resins each of which is respectively obtained by a reaction between one polyhydric phenol and epichlorohydrin.

TABLE 3

| | Epoxy resin | | Viscosity at 40° C. (poise) | Heat resistance temperature index (°C.) |
|---|---|---|---|---|
| Example 19 | Example 1 | | 3.0 | 225 |
| Comparative Example 1 | YL-932 DER-332 | 1 1 | 10.0 | 210 |
| Example 20 | Example 1 DER-332 | 1 1 | 0.5 | 220 |
| Comparative Example 2 | DER-7342 DER-332 | 1 2 | 3.5 | 208 |
| Example 21 | Example 1 DER-332 | 1 2 | 0.3 | 215 |
| Example 22 | Example 1 DER-332 | 1 3 | 0.1 | 210 |
| Example 23 | Example 6 | | 2.5 | 230 |
| Comparative Example 3 | YL-933 DER-332 | 1 1 | 8.5 | 210 |
| Example 24 | Example 4 | | 2.6 | 228 |
| Comparative Example 4 | YL-931 DER-332 | 1 1 | 9.2 | 210 |
| Example 25 | Example 15 | | 0.2 | 175 |
| Comparative Example 5 | DER-332 E-807 | 1 1 | 1.8 | 160 |
| Example 26 | Example 5 | | 2.5 | 223 |
| Example 27 | Example 7 | | 1.8 | 215 |
| Example 28 | Example 8 DER-332 | 1 1 | 1.2 | 220 |
| Example 29 | Example 9 DER-332 | 1 1 | 1.3 | 220 |
| Example 30 | Example 13 | | 0.4 | 210 |

The curing agent MHAC-P/epoxy resin equivalent ratio was adjusted to 0.95, and the amount of the curing catalyst 2E4MZ was 0.5% by weight.

EXAMPLES 31–53

An epoxy resin and an acid anhydride curing agent were mixed in a mixing ratio as shown in Table 4 or 5, and fully stirred. Added to this mixture was 0.5% by weight of a curing catalyst, and they were fully mixed. The resultant mixture had a viscosity at 50° C. as shown in Table 4 or 5. The mixture was heated at 100° C. for 10 hours, at 150° C. for 10 hours and at 230° C. for 10 hours to give a brown-colored clear cured product having a thickness of 2 mm.

The cured product was cut into samples having a size of 2×50×50 mm, and its heat resistance temperature index was determined, which is shown in Table 4 or 5.

TABLE 4

| Example | Epoxy resin | Acid anhydride curing agent | Viscosity at 40° C. (poise) | Heat resistance temperature index (°C.) |
|---|---|---|---|---|
| 31 | Example 10 | MHAC-P | 9.5 | 230 |
| 32 | Example 11 | MHAC-P | 0.8 | 215 |
| 33 | Example 12 | MHAC-P | 1.1 | 220 |
| 34 | Example 14 | MHAC-P | 4.5 | 230 |
| 35 | Example 16 | MHAC-P | 0.1 | 173 |
| 36 | Example 17 | MHAC-P | 0.2 | 172 |
| 37 | Example 18 | MHAC-P | 2.8 | 226 |
| 38 | Example 10 1 DER-332 1 | MHAC-P | 2.3 | 225 |
| 39 | Example 1 | HN-5500 | 2.8 | 220 |
| 40 | Example 1 | HN-2200 | 3.2 | 215 |
| 41 | Example 1 1 BPAN 1 | MHAC-P | 0.2 | 205 |
| 42 | Example 1 1 CEL-2021 1 | MHAC-P | 0.1 | 215 |
| 43 | Example 1 1 E-807 1 | MHAC-P | 0.4 | 218 |
| 44 | Example 2 | MHAC-P | 2.5 | 225 |
| 45 | Example 3 | MHAC-P | 2.4 | 225 |

The anhydride curing agent/epoxy resin equivalent ratio was adjusted to 0.95, and the amount of the curing catalyst 2E4MZ was 0.5% by weight.

TABLE 5

| Example | Epoxy resin | Cure accelerator | Viscosity at 40° C. (poise) | Heat resistance temperature index (°C.) |
|---|---|---|---|---|
| 46 | Example 1 | BTPP-K | 3.0 | 226 |
| 47 | Example 1 | PX-48T | 3.0 | 227 |
| 48 | Example 1 | 2E4M-K | 3.0 | 225 |
| 49 | Example 1 | TPP | 3.0 | 225 |
| 50 | Example 1 | TPP-K | 3.0 | 225 |
| 51 | Example 1 | IOZ | 3.0 | 225 |
| 52 | Example 1 | C11Z-AZINE | 3.0 | 225 |
| 53 | Example 1 | TEA-K | 3.0 | 225 |

The acid anhydride curing agent MHAC-P/epoxy resin equivalent ratio was adjusted to 0.95, and the amount of the curing catalyst was 1.0% by weight.

EXAMPLES 54–57

Figure 2:
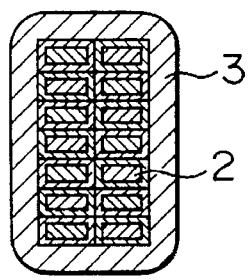
FIG. 2 is a cross sectional view of a coil as one embodiment of this invention.

FIG. 2 shows a cross sectional view of one embodiment of the coil of this invention. In FIG. 2, numeral 3 indicates a prepreg mica tape having a glass lining, and numeral 2 a conductor.

The prepreg mica tape having a glass lining was half-lappedly coiled around the conductor 2 four times as shown in FIG. 2, and then impregnated, under vacuum and pressure, with the thermosetting resin compositions obtained in Examples 19 to 21. Thereafter, the coil was cured under heat at 100° C. for 10 hours, at 150° C. for 10 hours and 230° C. for 10 hours.

Figure 3:
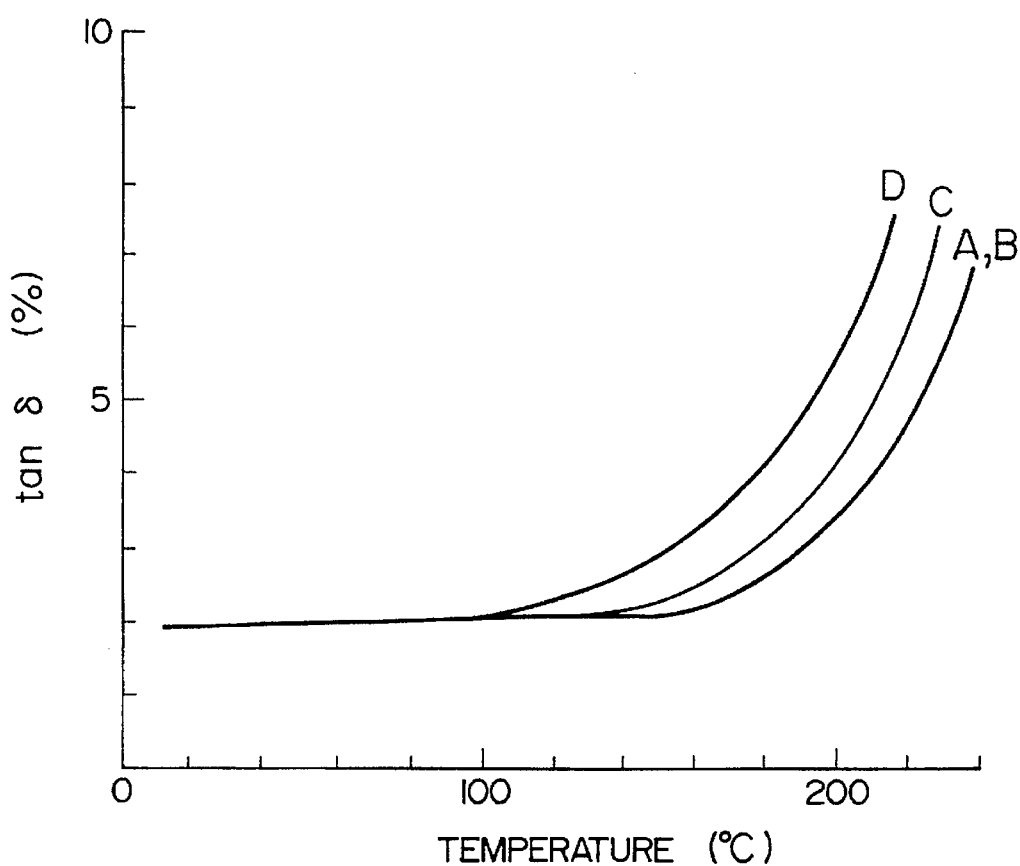
FIG. 3 is a graph showing tan δ temperature characteristics of a coil as one embodiment of this invention.

FIG. 3 shows temperature characteristics of dielectric loss tangent, tan δ, as a graph for a relationship between temperature (°C., abscissa axis) and tan δ (%, ordinate axis). In FIG. 3, A indicates an initial characteristic curve of insulation in Example 54, and B indicates a characteristic curve of insulation after the coil of Example 54 was heated at 250° C. for 1,000 hours. Further, C and D also indicate initial characteristic curves of the coils in Examples 55 and 56, respectively.

Figure 4:
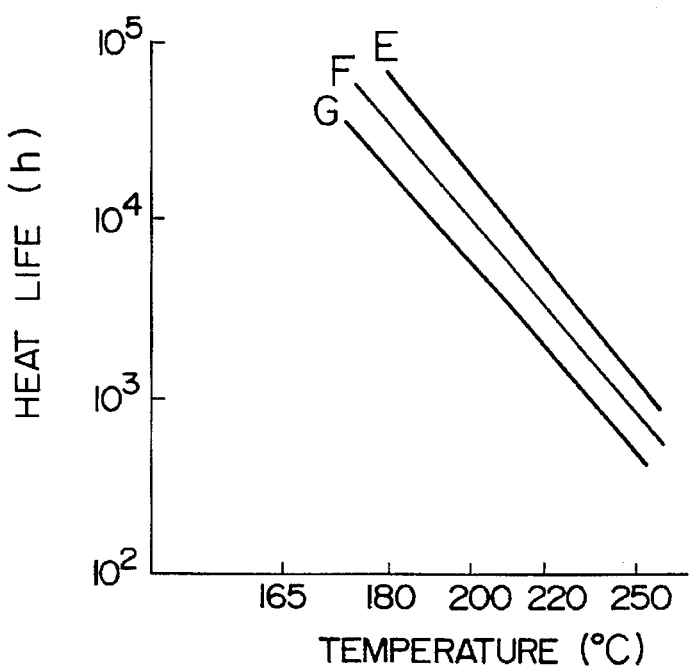
FIG. 4 is a graph showing heat life characteristics of this invention.

Further, FIG. 4 shows heat lives of coils of this invention as a graph for a relationship between temperature (°C., abscissa axis) and heat life (h, ordinate axis). In FIG. 4, E, F and G indicate characteristic curves of the coils of Examples 54, 55 and 56, respectively.

As shown in FIG. 4, the coils exhibited high heat resistance even concerning heat life on a moterette test according to U.S. Standard IEEE. No. 275, and it has been found the coils of this invention are usable at more than 180° C.

EXAMPLES 58–65

FIG. 5-a shows a perspective view of a ground coil for a linear motor car, and FIG. 5-b shows an enlarged cross section taken from its II—II line. As shown in FIG. 5-b, an Al conductor was prepared by coiling an epoxy prepreg mica tape 3 around a conductor 2 three times and curing it under heat and pressure. The resultant conductor was cast-molded under vacuum with a thermosetting resin composition 4 shown in Table 6, and cured under heat to give a ground driving guide coil 1.

An AC voltage of 10 kV was applied between a lead terminal of the driving guide coil and corona-shield wall, and a maximum discharge amount was measured to show as low as 0 to 50 pC in each of the Examples. Voids were rarely found. And, the procedure of maintaining the coil at an initial stage, at 80° C. for 30 minutes and at room temperature at 30 minutes was repeated 10 times. Then, the coil was immersed in a 5% salt water solution for 7 days, and its insulation resistance was measured to show 2,000 MΩ or more in each of these Examples. The coils obtained in these Examples were excellent in crack resistance and electrical properties.

As detailed above, the thermosetting resin composition of this invention has a low viscosity before cured and hence has good processability, and it also has high heat resistance and excellent crack resistance. Therefore, the ground driving guide coils for a linear motor car, prepared above, were all void-free and excellent in electrical and mechanical properties.

TABLE 6

| Example | Epoxy resin (g) | Acid anhydride curing agent (g) | Filler (g) | Curing catalyst (g) |
|---|---|---|---|---|
| 58 | Example 11 (176) | HN-5500 (160) | Crystalline silica (530) | 2E4MZ (3) |
| 59 | Example 1 (176) DER-332 (350) | HN-5500 (480) | Crystalline silica (1600) | 2E4MZ-CN (8) |
| 60 | Example 15 (173) | HN-5500 (160) | Crystalline silica (540) | PX-48T (4) |
| 61 | Example 16 (174) | HN-5500 (160) | Crystalline silica (550) | PX-48T (4) |
| 62 | Example 17 (175) | HN-5500 (160) | Crystalline silica (560) | PX-48T (4) |
| 63 | Example 15 (173) | HN-5500 (160) | Magnesium hydrate (550) | PX-48T (4) |
| 64 | Example 15 (173) | HN-5500 (160) | Hydrate alumina (550) | PX-48T (4) |
| 65 | Example 15 (173) | MHAC-P (169) | Crystalline silica (550) | PX-48T (4) |

EXAMPLES 66–73

As shown in FIG. 6, each of the ground driving guide coils 1 for a linear motor car, prepared in Examples 58 to 65, was embedded in an aggregate-containing Portland cement 5, to form a concrete panel. The electrical and mechanical properties of these ground driving guide coils embedded to form concrete panels did not differ at all from those the gound driving guide coils had before embedded.

What is claimed is:

1. A coil formed by impregnating or cast-molding a coil conductor with a thermosetting resin composition consisting essentially of:
   (A) a polyfunctional epoxy resin, having a total chlorine content of 0.17 to 0.23% by weight, produced from a reaction between a mixture of two polyhydric phenols selected from the group consisting of:
   (a) bis (4-hydroxyphenyl) methane,
   (b) bis(4-hydroxyphenyl)ethane,
   bis(4-hydroxyphenyl)propane,
   (d) tris(4-hydroxyphenyl)$C_1$–$C_8$ alkane,
   (e) tetra(4-hydroxyphenyl)$C_2$–$C_8$ alkane, and
   (f) bis(4-hydroxyphenyl)butane, and epichlorohydrin, and
   (B) an acid anhydride curing agent, and curing the resin composition; said resin composition exhibiting a viscosity at 40° C. of 10 poise or less before curing to promote coil impregnation or cast molding and high heat resistance after curing.

2. The coil according to claim 1, wherein the mixture contains two polyhydric phenols in equal weight proportions.

3. The coil according to claim 1, wherein the mixture of two polyhydric phenols is selected from the group consisting of:
   (i) (a) bis(4-hydroxyphenyl)methane and (d) tris(4-hydroxyphenyl) $C_1$–$C_8$ alkane,
   (ii) (b) bis(4-hydroxyphenyl)ethane and (d) tris(4-hydroxyphenyl)$C_1$–$C_8$ alkane,
   (iii) (c) bis(4-hydroxyphenyl) propane and (d) tris (4-hydroxyphenyl) $C_1$–$C_8$ alkane, and
   (iv) (c) bis(4-hydroxyphenyl)propane and (e) tetra(4-hydroxyphenyl)$C_1$–$C_8$ alkane.

4. The coil according to claim 1, wherein the mixture of two polyhydric phenols is selected from the group consisting of:
   (i) (a) bis(4-hydroxyphenyl)methane and (c) bis(4-hydroxyphenyl)propane, and
   (ii) (c) bis(4-hydroxyphenyl)propane and (d) tris(4-hydroxyphenyl)$C_1$–$C_8$ alkane.

5. The coil according to claim 1, wherein the polyfunctional epoxy resin is a reaction product between epichlorohydrin and a mixture of (c) bis(4-hydroxyphenyl)propane and (d) tris(4-hydroxyphenyl)methane.

6. The coil according to claim 1, wherein the polyfunctional epoxy resin is a reaction product between epichlorohydrin and a mixture of (c) bis(4-hydroxyphenyl)propane with (a) bis(4-hydroxyphenyl)methane.

7. The coil according to claim 1, wherein the acid anhydride curing agent is methylnadic anhydride, methylhexahydrophthalic anhydride or methyltetrahydrophthalic anhydride.

8. The coil according to claim 1, wherein the acid anhydride curing agent is methylnadic anhydride.

9. The coil according to claim 1, wherein the thermosetting composition comprises the polyfunctional epoxy resin produced from the reaction between 925 parts epichlorohydrin and the mixture of 105 parts of (c) bis(4-hydroxyphenyl)propane and 105 parts of (d) tris(4-hydroxyphenyl)methane, and methylnadic anhydride in which the methylnadic anhydride/epoxy resin equivalent ratio is 0.95.

10. A coil formed by coiling an insulating base material around a coil conductor, impregnating or cast-molding the coil conductor with a thermosetting resin composition consisting essentially of:
    (A) a polyfunctional epoxy resin, having a total chlorine content of 0.17 to 0.23% by weight, produced from a reaction between a mixture of two polyhydric phenols selected from the group consisting of:
    (a) bis(4-hydroxyphenyl)methane,
    (b) bis(4-hydroxyphenyl)ethane,
    (c) bis(4-hydroxyphenyl)propane,
    (d) tris(4-hydroxyphenyl)$C_1$–$C_8$ alkane,
    (e) tetra(4-hydroxyphenyl)$C_2$–$C_8$ alkane, and
    (f) bis(4-hydroxyphenyl)butane, and epichlorohydrin, and
    (B) an acid anhydride curing agent, and curing the resin composition; said resin composition exhibiting a viscosity at 40° C. of 10 poise or less before curing to promote coil impregnation or cast molding and high heat resistance after curing.

11. The coil according to claim 10, wherein the mixture contains two polyhydric phenols in equal weight proportions.

12. The coil according to claim 10, wherein the mixture of two polyhydric phenols is selected from the group consisting of:
    (i) (a) bis(4-hydroxyphenyl)methane and tris(4-hydroxyphenyl)$C_1$–$C_8$ alkane,
    (ii) (b) bis(4-hydroxyphenyl)ethane and tris(4-hydroxyphenyl)$C_1$–$C_8$ alkane,
    (iii) (c) bis(4-hydroxyphenyl)propane and (d) tris(4-hydroxyphenyl)$C_1$–$C_8$ alkane, and
    (iv) (c) bis(4-hydroxyphenyl)propane and (e) tetra(4-hydroxyphenyl)$C_1$–$C_8$ alkane.

13. The coil according to claim 10, wherein the mixture of two polyhydric phenols is selected from the group consisting of:
    (i) (a) bis(4-hydroxyphenyl)methane and (c) bis(4-hydroxyphenyl)propane, and
    (ii) (c) bis(4-hydroxyphenyl)propane and (d) tris(4-hydroxyphenyl)$C_1$–$C_8$ alkane.

14. The coil according to claim 10, wherein the polyfunctional epoxy resin is a reaction product between epichlorohydrin and a mixture of (c) bis(4-hydroxyphenyl)propane and (d) tris(4-hydroxyphenyl)methane.

15. The coil according to claim 10, wherein the polyfunctional epoxy resin is a reaction product between epichlorohydrin and a mixture of (c) bis(4-hydroxyphenyl)propane with (a) bis(4-hydroxyphenyl)methane.

16. The coil according to claim 10, wherein the acid anhydride curing agent is methylnadic anhydride, methylhexahydrophthalic anhydride or methyltetrahydrophthalic anhydride.

17. The coil according to claim 10, wherein the acid anhydride curing agent is methylnadic anhydride.

18. The coil according to claim 10, wherein the thermosetting composition comprises the polyfunctional epoxy resin produced from the reaction between 925 parts epichlorohydrin and the mixture of 105 parts of (c) bis(4-hydroxyphenyl)propane and 105 parts of (d) tris(4-hydroxyphenyl)methane, and methylnadic anhydride in which the methylnadic anhydride/epoxy resin equivalent ratio is 0.95.

19. The coil according to claim 1, wherein the mixture of two polyhydric phenols is selected from the group consisting of:
    (i) a mixture of (a) bis(4-hydroxyphenyl)methane and (b) bis(4-hydroxyphenyl)ethane in a weight ratio of 100:107, (ii) a mixture of (a) bis(4-hydroxyphenyl)methane and (c) bis(4-hydroxyphenyl)propane in a weight ratio of 100:114, (iii) a mixture of (a) bis(4-hydroxyphenyl)methane and (d) tris(4-hydroxyphenyl)methane in a weight ratio of 1:1, (iv) a mixture of (b) bis(4-hydroxyphenyl)ethane and (c) bis(4-hydroxyphenyl)propane in a weight ratio of 107:114, (v) a mixture of (c) bis(4-hydroxyphenyl)propane and (d) tris(4-hydroxyphenyl)$C_1$–$C_8$ alkane in a weight ratio within the range of from 111:150 to 205:20, (vi) a mixture of (c) bis(4-hydroxyphenyl)propane and (e) tetra(4-hydroxyphenyl)$C_2$–$C_8$ alkane in a weight ratio within the range of from 1:1 to 110:117, and (vii) a mixture of (d) tris(4-hydroxyphenyl)methane and (f) bis(4-hydroxyphenyl)butane in a weight ratio of 1:1.

20. The coil according to claim 10, wherein the mixture of two polyhydric phenols is selected from the group consisting of:

(i) a mixture of (a) bis(4-hydroxyphenyl)methane and (b) bis(4-hydroxyphenyl)ethane in a weight ratio of 100:107, (ii) a mixture of (a) bis(4-hydroxyphenyl)methane and (c) bis(4-hydroxyphenyl)propane in a weight ratio of 100:114, (iii) a mixture of (a) bis(4-hydroxyphenyl)methane and (d) tris(4-hydroxyphenyl)methane in a weight ratio of 1:1, (iv) a mixture of (b) bis(4-hydroxyphenyl)ethane and (c) bis(4-hydroxyphenyl)propane in a weight ratio of 107:114, (v) a mixture of (c) bis(4-hydroxyphenyl)propane and (d) tris(4-hydroxyphenyl)$C_1$–$C_8$ alkane in a weight ratio within the range of from 111:150 to 205:20, (vi) a mixture of (c) bis(4-hydroxyphenyl)propane and (e) tetra(4-hydroxyphenyl)$C_2$–$C_8$ alkane in a weight ratio within the range of from 1:1 to 110:117, and (vii) a mixture of (d) tris(4-hydroxyphenyl)methane and (f) bis(4-hydroxyphenyl)butane in a weight ratio of 1:1.

21. The coil according to claim 1, wherein the polyfunctional epoxy resin has an epoxy equivalent of 160 to 189 g/equiv.

22. The coil according to claim 10, wherein the polyfunctional epoxy resin has an epoxy equivalent of 160 to 189 g/equiv.

* * * * *